(12) United States Patent
Subbulakshmi et al.

(10) Patent No.: US 12,145,459 B1
(45) Date of Patent: Nov. 19, 2024

(54) SMART ENERGY MANAGER FOR VEHICLE

(71) Applicant: FCA US LLC, Auburn Hills, MI (US)

(72) Inventors: Nallaperumal Subbiah Subbulakshmi, Chennai (IN); Mohanasajiv Vijayan, Chennai (IN); Archana Kasture, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 19 days.

(21) Appl. No.: 18/315,698

(22) Filed: May 11, 2023

(51) Int. Cl.
| | |
|---|---|
| *B60L 53/18* | (2019.01) |
| *B60L 53/16* | (2019.01) |
| *B60L 53/57* | (2019.01) |
| *B60L 53/60* | (2019.01) |

(52) U.S. Cl.
CPC ............ *B60L 53/18* (2019.02); *B60L 53/16* (2019.02); *B60L 53/57* (2019.02); *B60L 53/60* (2019.02)

(58) Field of Classification Search
CPC .......... B60L 53/18; B60L 53/16; B60L 53/57; B60L 53/60
See application file for complete search history.

(56) References Cited

U.S. PATENT DOCUMENTS

| | | | |
|---|---|---|---|
| 2018/0201144 A1* | 7/2018 | Newman | B60D 1/62 |
| 2022/0247185 A1* | 8/2022 | Erikson | B60R 16/03 |
| 2024/0140247 A1* | 5/2024 | Kromrey | B60L 53/66 |

* cited by examiner

*Primary Examiner* — Daniel Cavallari
*Assistant Examiner* — Thai H Tran
(74) *Attorney, Agent, or Firm* — Jeremy J. Klobucar

(57) ABSTRACT

A smart energy manager for an electrified vehicle is provided. In one exemplary implementation, the smart energy manager includes a control unit, a vehicle-to-control unit power cable assembly, a vehicle-to-vehicle power cable assembly, an A/C charge power cable assembly and an offboard power panel A/C sourcing cable assembly. The control unit has a control unit housing including a user interface panel. The vehicle-to-control unit power cable assembly has a first end electrically coupled to the control unit and a second end having a first charge connector configured to electrically couple to a charging port of the electrified vehicle. The control unit is configured to selectively and alternatively route power based on an input at the user interface panel indicative of an operational mode relative to the electrified vehicle and a second charge connector; an A/C plug or a power panel.

14 Claims, 4 Drawing Sheets

SMART ENERGY MANAGER FOR VEHICLE

FIELD

The present application relates generally to electrified vehicles and, more particularly, to a smart energy manager configured for bi-directional power transfer with an electrified vehicle.

BACKGROUND

An electrified vehicle (hybrid electric, plug-in hybrid electric, range-extended electric, battery electric, etc.) includes at least one battery system and at least one electric motor. Typically, the electrified vehicle could include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. Electrified vehicles require an electrical charging cord, such as a Type 2/Level 2 portable charger, that electrically couples between a power source and the vehicle battery. Some electrified vehicles have accessory power panels that allow for auxiliary devices to be plugged in, such as during electrical power outages or other circumstances where electrical power is unavailable. In other examples, some electrified vehicles can provide vehicle-to-vehicle charging by electrically coupling a dedicated vehicle-to-vehicle charging cable between a doner vehicle and a receiver vehicle. Each of the scenarios require a dedicated electrical cable for achieving the desired purpose. Accordingly, while such electrified vehicle charging and accessory connections do work for their intended purpose, there exists an opportunity for improvement in the relevant art.

SUMMARY

In accordance with one example aspect of the invention, a smart energy manager for an electrified vehicle is provided. In one exemplary implementation, the smart energy manager includes a control unit, a vehicle-to-control unit power cable assembly, a vehicle-to-vehicle power cable assembly, an A/C charge power cable assembly and an offboard power panel A/C sourcing cable assembly.

In addition to the foregoing, the control unit has a control unit housing including a user interface panel. The vehicle-to-control unit power cable assembly has a first end electrically coupled to the control unit and a second end having a first charge connector configured to electrically couple to a charging port of the electrified vehicle.

In addition to the foregoing, the vehicle-to-vehicle power cable assembly has a first end configured to electrically couple to the control unit and a second end having a second charge connector configured to electrically couple to one of a donor and receiver electrified vehicle.

In addition to the foregoing, the A/C charge power cable assembly has a first end configured to electrically couple to the control unit and a second end having an A/C plug. The offboard power panel A/C sourcing cable assembly has a first end configure to electrically couple to the control unit and a second end having a power panel including at least one A/C inlet.

In addition to the foregoing, the control unit is configured to selectively and alternatively route power based on an input at the user interface panel indicative of an operational mode relative to the electrified vehicle and (i) the second charge connector; (ii) the A/C plug; and (iii) the power panel.

In addition to the foregoing, the control unit comprises a power switch. The power switch comprises a button configured to toggle between each of the operational modes. The power panel comprises at least one universal serial bus (USB) input. The power panel comprise two banks of A/C inlets. The power panel comprises a panel power status light emitting diode and a vehicle status light emitting diode.

In addition to the foregoing, the first end of the vehicle-to-control unit power cable assembly includes a first coupling that selectively and releasably connects to a complementary second coupling provided on the control unit. The first end of the A/C charge power cable assembly includes a first coupling that selectively and releasably connects to a complementary second coupling provided on the control unit. The offboard power panel A/C sourcing cable assembly includes a first coupling that selectively and releasably connects to a complementary second coupling provided on the control unit. A mode is selected from a user interface panel on a control unit. The modes comprise a first mode including a vehicle-to-vehicle charge mode; a second mode including an A/C charge mode; and a third mode including an offboard power panel A/C mode. One of the following is connected based on the selected mode: (i) a vehicle-to-vehicle power cable assembly to a second electrified vehicle based on selection of the first mode, (ii) an A/C charge power cable assembly to a power grid based on selection of the second mode, and (iii) an offboard power panel A/C sourcing cable assembly to a load based on selection of the third mode.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, there exists an opportunity for improvement in the art of cable management in electrified vehicles. For example, electrified vehicles are generally required to electrically connect a cable between the vehicle and a power source for charging the high-voltage battery of the electric vehicle (A/C charging). In some instances an owner of an electrified vehicle may wish to use the high-voltage battery of the vehicle as a power source for powering various auxiliary devices utility tools, electric toaster, dryer camping equipment, or any other electrical appliance that requires A/C power (offboard power panel A/C sourcing). In such examples, a power panel can be electrically coupled to the electrified vehicle to provide A/C power, converted from the high-voltage battery of the electrified vehicle, to the various auxiliary devices. In other examples, an owner of an electrified vehicle may wish to provide power to another electrified vehicle that is out of charge (vehicle-to-vehicle or V2V charging). In such examples, a vehicle-to-vehicle electrical cable can be electrically coupled between a doner vehicle and a receiving vehicle whereby the doner vehicle can provide a charge to the receiving vehicle. Each of the scenarios require a dedicated electrical cable for achieving the desired purpose.

The present disclosure provides a smart energy manager that provides a single device having a single interface offering an all-in-one solution for A/C charging, offboard power panel A/C sourcing, and V2V charging. The smart energy manager is compatible with any electrified vehicle having a charge port and a bi-directional inverter. A vehicle without a bi-directional inverter can also use the smart energy manager to charge the vehicle with AC power.

Figure 1:
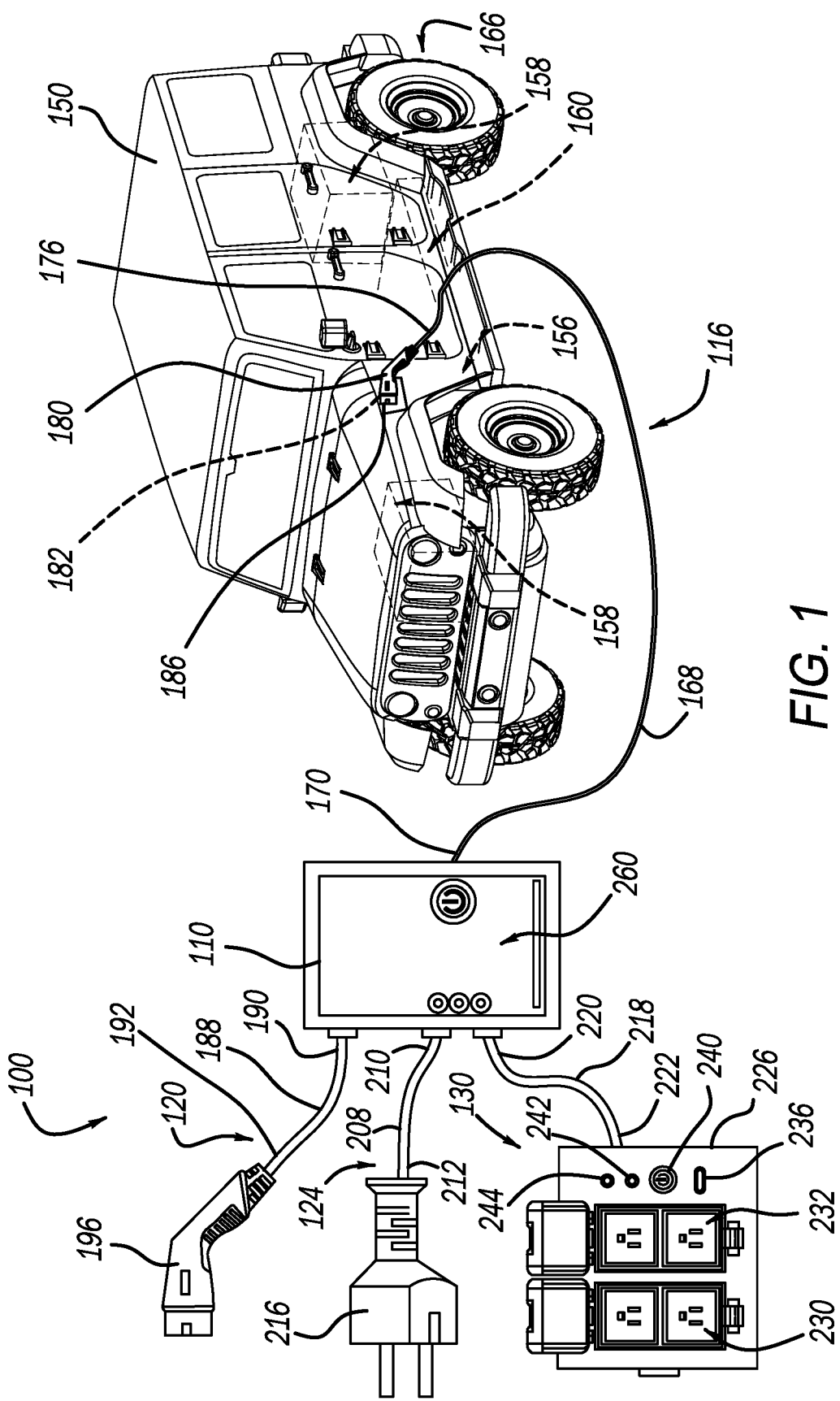
FIG. 1 is a partial schematic representation of a smart energy manager shown cooperating with an electrified vehicle according to the principles of the present disclosure.

Referring now to FIG. 1, a partial schematic representation of a smart energy manager 100 according to examples of the present disclosure is shown. The smart energy manager 100 includes a control unit 110, a vehicle-to-control unit power cable assembly 116, a vehicle-to-vehicle power cable assembly 120, an A/C charge power cable assembly 124 and an offboard power panel A/C sourcing cable assembly 130. The vehicle-to-control unit power cable assembly 116 is configured to selectively electrically connect to an electrified vehicle 150. The electrified vehicle 150 generally includes an electrified powertrain 156 comprising one or more electric motors 158. The electric motor(s) 108 are powered by a high voltage battery system 160 (e.g., a 16 kilowatt-hour (kWh) lithium-ion battery pack) and generate drive torque that is transferred to a driveline 166 of the vehicle 150. The high-voltage battery system 160 according to the example shown is configured as a 48 volt battery system (1 kilowatt-hour) although other voltages are contemplated.

The vehicle-to-control unit power cable assembly 116 generally comprises a cable 168 having first end 170 that is directly wired to the control unit 110 and a second end 176 having a first vehicle charge connector or side coupler 180 that is configured to selectively electrically and mechanically connect to a vehicle charging inlet 182 provided at a charging port 186 on the vehicle 150. The vehicle-to-vehicle power cable assembly 120 generally comprises a cable 188 having a first end 190 directly wired to the control unit 110 and a second end 192 having a second vehicle charge connector 196.

The A/C charge power cable assembly 124 generally comprises a cable 208 having a first end 210 directly wired to the control unit 110 and a second end 212 having an A/C plug 216. It will be appreciated that the A/C plug 216 is generically represented but can be configured to be plug types specific for use with any vehicle charging situation (e.g., Type 1, 110V; Type 2, 220V). The offboard power panel A/C sourcing cable assembly 130 generally comprises a cable 218 having a first end 220 directly wired to the control unit 110 and a second end 222 having a power panel 226. The power panel 226 can include banks of A/C inlets 230 and 232, a universal serial bus (USB) inlet 236, an ON/OFF power switch 240, a panel power status light emitting diode (LED) 242 and a vehicle status LED 244. While the offboard power panel A/C sourcing cable assembly 130 is shown generally associated with the power panel 226, the offboard power panel A/C sourcing cable assembly 130 can alternatively comprise electrical connections for powering a home. It will be appreciated that additional specific hardware and isolation would be incorporated at the home to accept energy from the vehicle 150.

Figure 2:
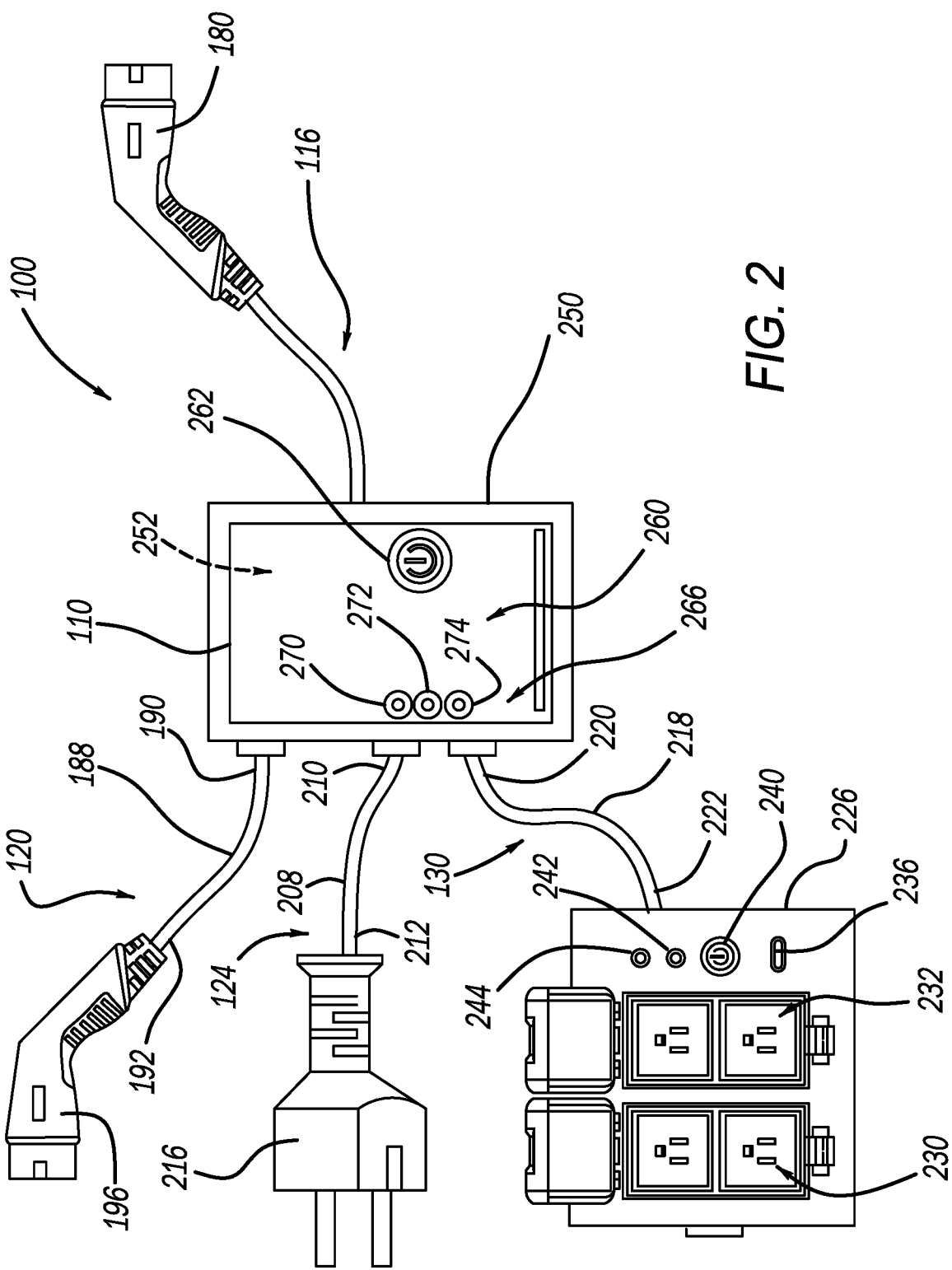
FIG. 2 is a schematic diagram of the smart energy manager of FIG. 1.

With continued reference to FIG. 1 and additional reference to FIG. 2, the control unit 110 will be further described. The control unit 110 generally includes a control unit housing 250 that houses a controller 252. The control unit housing 250 further includes a user interface panel 260. The user interface panel 260 generally includes a power ON/OFF switch or button 262 and a status indicator display 266. The status indicator display 266 can reflect operational modes and include a first indicator 270 indicative of a primary vehicle charging event, a second indicator 272 indicative of a vehicle-to-vehicle charging event and a third indicator 274 indicative of offboard power panel A/C sourcing or vehicle-to-load sourcing. The controller 252 provides circuitry that receives a user input from the user interface panel 260 and determines whether the proper cord assemblies are connected to achieve the desired electrical function. Once the controller 252 confirms proper electrical connections, the controller 252 permits the flow of energy between the high-voltage battery 160 in the vehicle 150 and the desired cord assembly 120, 124, 130.

Figure 3:
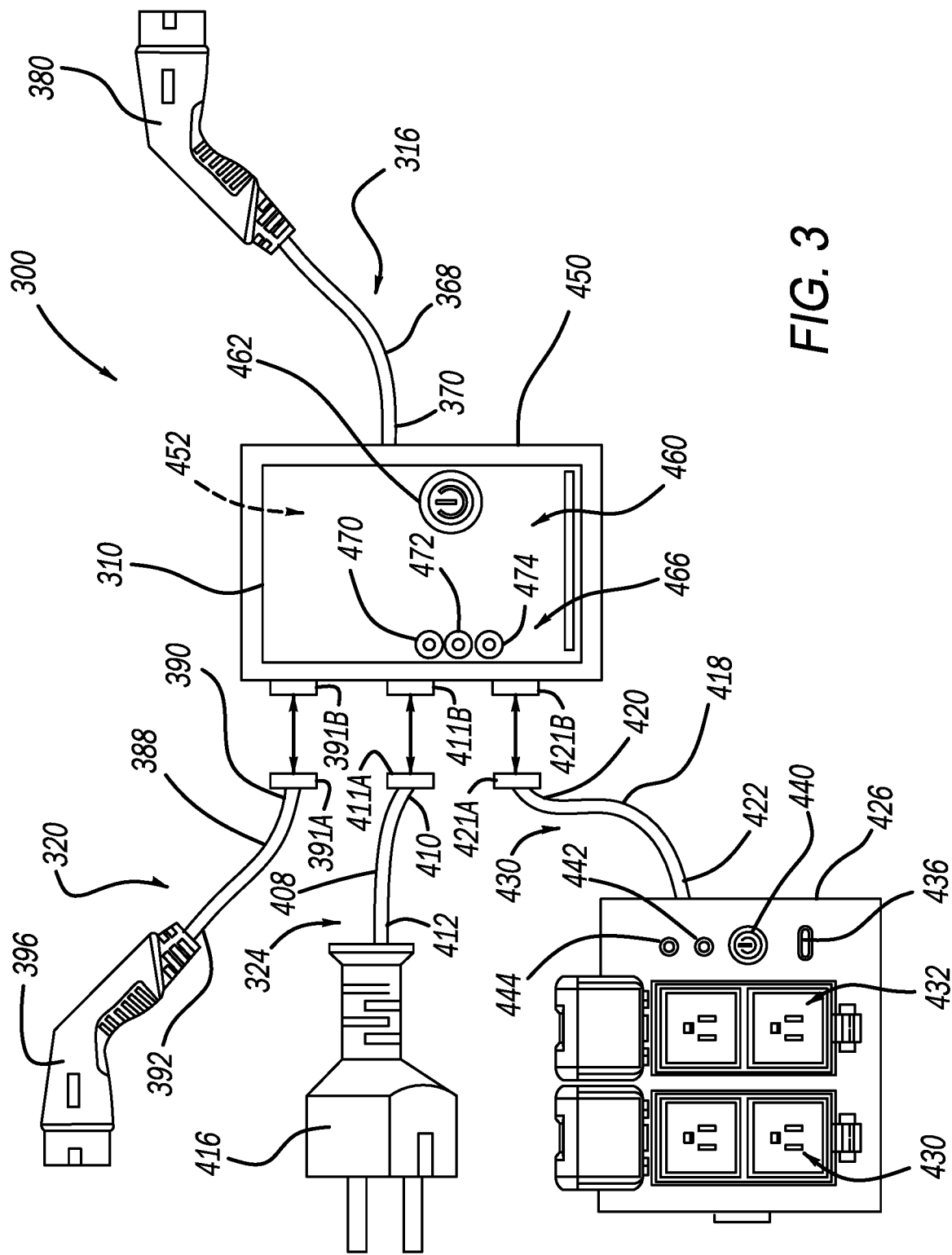
FIG. 3 is a schematic diagram of a smart energy manager having selectively detachable electrical connections according to another example of the present disclosure.

Turning now to FIG. 3, a smart energy manager 300 configured according to additional features of the present disclosure will be described. Unless described differently, the portable power panel 300 can be configured similarly to the portable power panel 100. In this regard, like components increased by 200 have been denoted in FIG. 3 to represent like components described above with respect to the smart energy manager 100.

The vehicle-to-control unit power cable assembly 316 generally comprises a cable 368 having first end 370 that is directly wired to the control unit 310 and a second end 376 having a first vehicle charge connector 380 that is configured to selectively electrically and mechanically connect to a vehicle charging inlet 182 provided at a charging port 186 on the vehicle 150. The vehicle-to-vehicle power cable assembly 320 generally comprises a cable 388 having a first end 390 including a first coupling 391A that selectively and releasably connects to a complementary second coupling 391B provided on the control unit 310. A second end 392 of the vehicle-to-vehicle power cable assembly 320 has a second vehicle charge connector 396.

The A/C charge power cable assembly 324 generally comprises a cable 408 having a first end 410 including a first coupling 411A that selectively and releasably connects to a complementary second coupling 411B provided on the control unit 310. A second end 412 has an A/C plug 416. The offboard power panel A/C sourcing cable assembly 430 generally comprises a cable 418 having a first end 420 including a first coupling 421A that selectively and releasably connects to a complementary second coupling 421B provided on the control unit 310. A second end 422 has a power panel 426. The power panel 426 can include banks of A/C inlets 430 and 232, a universal serial bus (USB) inlet 436, an ON/OFF power switch 440, a panel power status light emitting diode (LED) 442 and a vehicle status LED 444.

The control unit 310 generally includes a control unit housing 450 that houses a controller 452. The control unit housing 450 further includes a user interface panel 460. The user interface panel 260 generally includes a power ON/OFF switch or button 462 and a status indicator display 466. The status indicator display 466 can include a first indicator 470 indicative of a primary vehicle charging event, a second indicator 472 indicative of a vehicle-to-vehicle charging event and a third indicator 474 indicative of offboard power panel A/C sourcing or vehicle-to-load sourcing.

The portable power panel 300 provides disconnectable cords 320, 324 and 430. In advantages, the vehicle-to-vehicle power cable assembly 320, the A/C charge power cable assembly 324 and the offboard power panel A/C sourcing cable assembly 430 are each releasable connected to the control unit 310. In advantages only one of the cables 320, 324 and 430 need be connected to the control unit depending on the desired electrical task to be performed. It is contemplated that the first couplings 391A, 411A, 421A and the second couplings 391B, 411B, 421B can be configured to be any electrical connections that can be easily connected and disconnected. In examples, each of the second couplings 391B, 411B and 421B can have a cover (not shown) that releasably covers the coupling when not in use.

Figure 4:
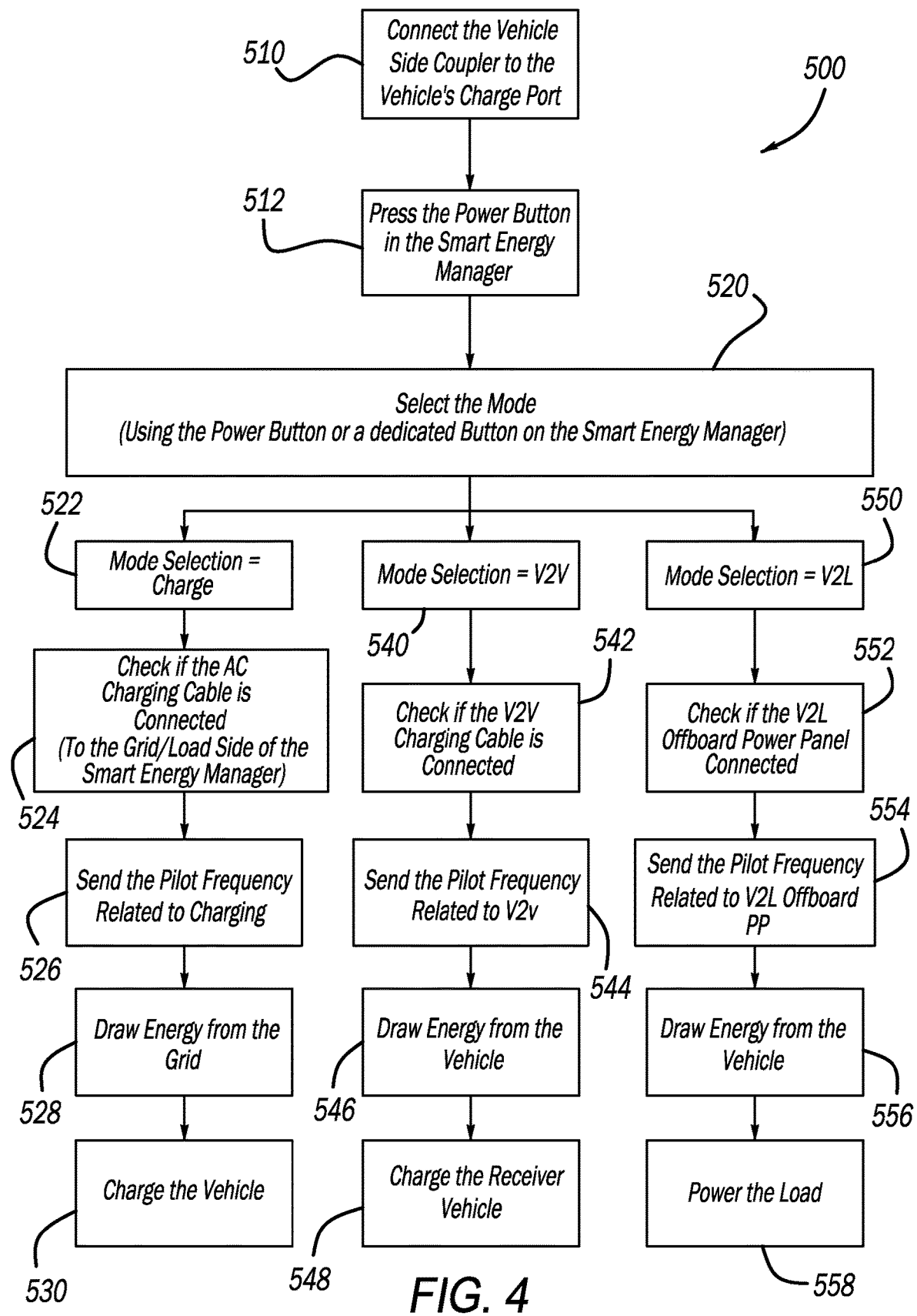
FIG. 4 is a flow chart illustrating exemplary use case scenarios for the smart energy manager of FIG. 1 according to various examples of the present disclosure.

Turning now to FIG. 4, a flow chart 500 is shown illustrating exemplary use case scenario methods for the smart energy manager according to various examples of the present disclosure. At 510 the vehicle charge connector 180 is coupled to the charging port 186. At 512, a user presses the power button 262 on the control unit 110 of the smart energy manager. At 520 a user selects the mode (charge, V2V or V2L). In examples, the mode may be sequenced by pushing the power button 262 or another dedicated button on the control unit 110. Based on the mode selection (charge, V2V or V2L), the control unit 110 sends a signal to the electrified vehicle 150 indicative of the selected mode though a pilot signal through a unique frequency. Exemplary frequencies will now be described. For A/C V2L, 125 Hz pilot frequency can output 120 Volts A/C and current corresponding to the pulse width modulation (PWM) value. For A/C V2V, 166 Hz pilot frequency can output 240 Volts A/C and current corresponding to the PWM value. For single or three phase A/C V2V or V2L, 250 Hz pilot frequency can output 220/380 Volts A/C current corresponding to the PWM value. For single or three phase A/C V2V or V2L, 500 Hz pilot frequency can output 230/400 Volts A/C current corresponding to the PWM value. Based on the pilot frequency, the vehicle 150 will have the capability, in combination with a bi-directional inverter, to distinguish the feature and provide power or receive power.

If the mode selection is "charge" at 522, control confirms that the A/C charge power cable assembly 124 or 324 is connected. At 526 control sends a pilot frequency related to charging. At 528 control draws energy from the grid. At 530, the vehicle 150 is charged.

If the mode selection is "V2V" at 540, control confirms that the vehicle-to-vehicle power cable assembly 120 or 320 is connected. At 544 control sends a pilot frequency related to V2V charging. At 546, control draws energy from the high-voltage battery 160 of the donor vehicle 150. At 548, control sends the energy to the receiving vehicle.

If the mode selection is "V2L" at 550, control confirms that the offboard power panel A/C sourcing cable assembly 130 or 330 is connected. At 554, control sends a pilot frequency related to V2L. At 556, control draws energy from the high-voltage battery 160 of the vehicle 150. At 558, control sends the energy to the load connected to the power panel 226 or 426.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A smart energy manager for an electrified vehicle, the smart energy manager comprising:
   a control unit having a control unit housing including a user interface panel;
   a vehicle-to-control unit power cable assembly having a first end electrically coupled to the control unit and a second end having a first charge connector configured to electrically couple to a charging port of the electrified vehicle;
   a vehicle-to-vehicle power cable assembly having a first end configured to electrically couple to the control unit and a second end having a second charge connector configured to electrically couple to one of a donor and receiver electrified vehicle;
   an A/C charge power cable assembly having a first end configured to electrically couple to the control unit and a second end having an A/C plug; and
   an offboard power panel A/C sourcing cable assembly having a first end configured to electrically couple to the control unit and a second end having a power panel including at least one A/C inlet;
   wherein the control unit is configured to selectively and alternatively route power based on an input at the user interface panel indicative of an operational mode relative to the electrified vehicle and (i) the second charge connector; (ii) the A/C plug; and (iii) the power panel.

2. The smart energy manager of claim 1, wherein the control unit comprises a power switch.

3. The smart energy manager of claim 2, wherein the power switch comprises a button configured to toggle between each of the operational modes.

4. The smart energy manager of claim 1, wherein the power panel comprises at least one universal serial bus (USB) input.

5. The smart energy manager of claim 4, wherein the power panel comprises two banks of A/C inlets.

6. The smart energy manager of claim 5, wherein the power panel comprises a panel power status light emitting diode and a vehicle status light emitting diode.

7. The smart energy manager of claim 1, wherein the first end of the vehicle-to-vehicle power cable assembly includes a first coupling that selectively and releasably connects to a complementary second coupling provided on the control unit.

8. The smart energy manager of claim 1, wherein the first end of the A/C charge power cable assembly includes a first coupling that selectively and releasably connects to a complementary second coupling provided on the control unit.

9. The smart energy manager of claim 1, wherein the offboard power panel A/C sourcing cable assembly includes a first coupling that selectively and releasably connects to a complementary second coupling provided on the control unit.

10. A method for using a smart energy manager for an electrified vehicle, the method comprising:
   connecting a vehicle-to-control unit power cable assembly to a charging port of the electrified vehicle;
   selecting a mode from a user interface panel on a control unit, the modes comprising a first mode including a vehicle-to-vehicle charge mode; a second mode including an A/C charge mode; and a third mode including an offboard power panel A/C mode; and
   connecting one of (i) a vehicle-to-vehicle power cable assembly to a second electrified vehicle based on selection of the first mode, (ii) an A/C charge power cable assembly to a power grid based on selection of the second mode, and (iii) an offboard power panel A/C sourcing cable assembly to a load based on selection of the third mode.

11. The method of claim 10, wherein selecting the mode comprises indexing a power button on the control unit.

12. The method of claim 10, further comprising electrically coupling the vehicle-to-vehicle power cable assembly to the control unit based on selection of the first mode.

13. The method of claim 10, further comprising electrically coupling the A/C charge power cable assembly to the control unit based on selection of the second mode.

14. The method of claim 10, further comprising electrically coupling the offboard power panel A/C sourcing cable assembly to the control unit based on selection of the third mode.

* * * * *